T. W. LUKER.
WIRE STRETCHER.
APPLICATION FILED APR. 29, 1912.

1,033,715.

Patented July 23, 1912.

Witnesses
Rohe Meyer.
A. L. Hough

Inventor
T. W. Luker.
By Franklin N. Hough
Attorney

UNITED STATES PATENT OFFICE.

THOMAS W. LUKER, OF NEW VIENNA, OHIO.

WIRE-STRETCHER.

1,033,715.  Specification of Letters Patent.  Patented July 23, 1912.

Application filed April 29, 1912. Serial No. 693,883.

*To all whom it may concern:*

Be it known that I, THOMAS W. LUKER, a citizen of the United States, residing at New Vienna, in the county of Clinton and State of Ohio, have invented certain new and useful Improvements in Wire-Stretchers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wire stretchers and comprises a simple and efficient apparatus of this nature having various details of construction and combinations and arrangements of parts which will be hereinafter fully described, shown in the accompanying drawings and then specifically defined in the appended claim.

My invention is illustrated in the accompanying drawings, in which:—

Figure 1:
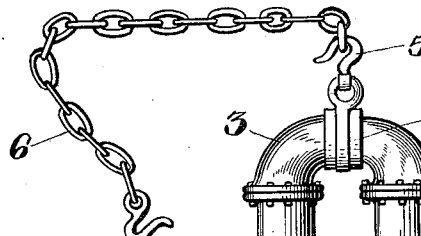
Figure 3:
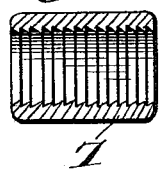
Figure 2:
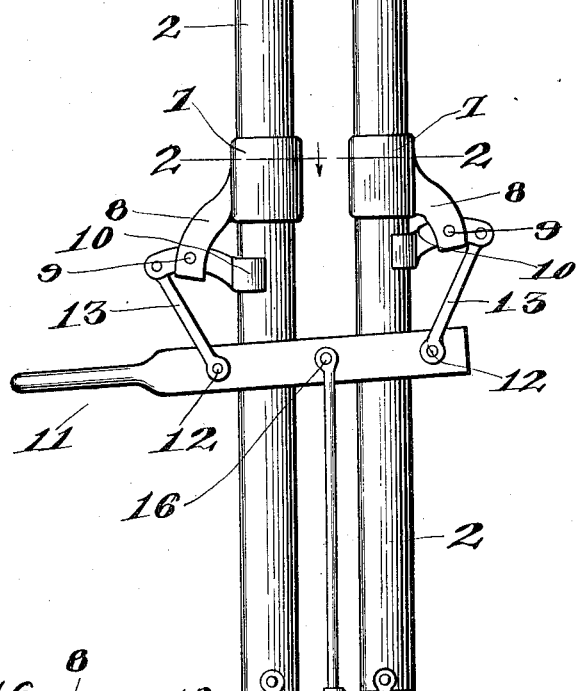
Figure 2:
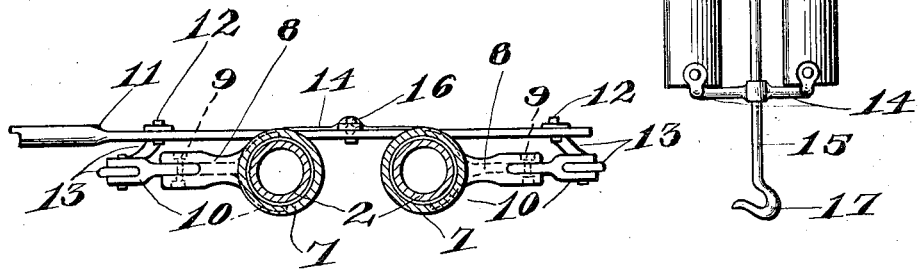

Figure 1 is a top plan view of the apparatus. Fig. 2 is a sectional view on line 2—2 of Fig. 1, and Fig. 3 is a central longitudinal section of one of the clutch sleeves.

Reference now being had to the details of the drawings by numeral, 2 designates a frame of the device, made preferably of piping with two parallel portions connected together at corresponding ends with a semi-circular tubular section 3 carrying a collar 4 to which a hook 5 is fastened. One end of the anchor chain 6 is fastened to the hook 5 and its other end is designed to be secured to a post or other object.

Mounted to have a sliding movement upon the two parallel tubular portions of the frame are the clutch sleeves 7, the inner edges of which are adapted to bite into the pipe sections upon which they are mounted at points diametrically opposite. Each sleeve is provided with an integral arm 8 having a slotted end, the walls of which are apertured for the reception of a pivotal pin 9 upon which a curved clutch lever 10 is mounted which has a forked end, the arms of which frictionally engage the parallel pipe sections of the frame. An operating lever, designated by numeral 11, carries pivotal pins 12 to which the ends of the links 13 are pivotally connected and which links in turn are pivotally fastened one to each outer end of the clutch levers 10.

Fastened to the ends of the parallel sections of the frame is a guide plate 14, the ends of which are angled and fastened to the frame and said guide plate is provided with a central aperture for the reception of the draw bar 15, one end of which is pivotally mounted upon a pin 16 carried by the lever 11 and its other end formed into a hook 17 to which the wire strand or fabric of which the fence is composed is adapted to be fastened.

The operation of my invention will be readily understood and is as follows:—The anchor chain is adapted to be securely fastened to any fixed object and the single strand of wire or wire fabric to be stretched is fastened to the hook 17. The operator by pulling and pushing upon the handle end of the lever 11 may cause one of the gripping members 10 and the collar carrying the same to grip the tubular portion of the frame upon which the latter is mounted and form a fulcrum while the corresponding collar and clutch member upon the opposite parallel portion of the frame slides freely thereon, thus allowing a new purchase for the device when the operating lever 11 is moved in an opposite direction. By this manipulation of the lever back and forth a creeping action is afforded which will cause the draw bar to stretch the wire fabric or strands secured thereto toward the anchorage end of the stretcher. The purchase upon the wire will be securely held from any pull in the opposite direction by the clutches biting into the two parallel portions of the stretcher frame.

What I claim to be new is:—

A wire stretcher comprising a frame with two parallel portions, anchorage means fastened to one end thereof, an apertured guide plate secured to the opposite end of the frame, a draw bar movable through the opening in said plate, an operating lever to which the draw bar is pivoted, clutch sleeves movable upon parallel portions of the frame, each sleeve having an integral arm, a clutch lever pivoted to each arm, and pivotal link connections between each clutch lever and said operating lever, as set forth.

In testimony whereof I hereunto affix my signature in the presence of two witnesses.

THOMAS W. LUKER.

Witnesses:
W. T. MATTHEWS,
J. W. MATTHEWS.

Copies of this patent may be obtained for five cents each, by addressing the "Commissioner of Patents, Washington, D. C."